US008775656B2

(12) United States Patent
Arora et al.

(10) Patent No.: US 8,775,656 B2
(45) Date of Patent: Jul. 8, 2014

(54) STRATEGIES FOR INTEGRATING PLURAL MODES OF CONTENT DELIVERY

(75) Inventors: Gagan Arora, Menlo Park, CA (US); Prasad V. R. Panchangam, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1705 days.

(21) Appl. No.: 11/548,257

(22) Filed: Oct. 10, 2006

(65) Prior Publication Data

US 2008/0086569 A1 Apr. 10, 2008

(51) Int. Cl.
G06F 15/16 (2006.01)
G06F 3/00 (2006.01)
G06F 13/00 (2006.01)
H04N 5/445 (2011.01)

(52) U.S. Cl.
USPC ............................................ 709/231; 725/59

(58) Field of Classification Search
USPC ............................................ 709/231; 725/59
See application file for complete search history.

(56) References Cited

U.S. PATENT DOCUMENTS

| 4,573,072 | A |   | 2/1986  | Freeman           |        |
|-----------|---|---|---------|-------------------|--------|
| 5,638,112 | A |   | 6/1997  | Bestler et al.    |        |
| 5,812,928 | A |   | 9/1998  | Watson, Jr. et al.|        |
| 5,848,397 | A |   | 12/1998 | Marsh et al.      |        |
| 5,982,411 | A |   | 11/1999 | Eyer et al.       |        |
| 6,003,041 | A | * | 12/1999 | Wugofski          | 1/1    |
| 6,005,597 | A |   | 12/1999 | Barrett et al.    |        |
| 6,188,871 | B1|   | 2/2001  | Kitamura et al.   |        |
| 6,243,145 | B1|   | 6/2001  | Schlarb et al.    |        |
| 6,546,016 | B1|   | 4/2003  | Gerszberg et al.  |        |
| 6,557,031 | B1| * | 4/2003  | Mimura et al.     | 709/218|
| 6,889,385 | B1| * | 5/2005  | Rakib et al.      | 725/119|
| 6,915,531 | B2|   | 7/2005  | Yun               |        |
| 6,990,680 | B1| * | 1/2006  | Wugofski          | 725/58 |
| 7,027,716 | B1|   | 4/2006  | Boyle et al.      |        |
| 7,152,236 | B1| * | 12/2006 | Wugofski et al.   | 725/40 |
| 7,346,917 | B2| * | 3/2008  | Gatto et al.      | 725/5  |
| 8,156,527 | B2| * | 4/2012  | Walter et al.     | 725/45 |
| 8,365,230 | B2| * | 1/2013  | Chane et al.      | 725/59 |

(Continued)

FOREIGN PATENT DOCUMENTS

WO  WO2005111893  11/2005
WO  WO2006003543   1/2006

OTHER PUBLICATIONS

Sakthi S. G. "Open Cable Set-Top mBox." [Retreived Online on May 3, 2009] Published in 2005. [Retreived from the Internet] <URL:www.wipro.com/pdf_files/Opem_cable_set_top_box.pdf>.*

(Continued)

Primary Examiner — Joseph E Avellino
Assistant Examiner — James Baron
(74) Attorney, Agent, or Firm — Micah P. Goldsmith; Glen Johnson; Micky Minhas

(57) ABSTRACT

A hybrid system is described which allows an Internet Protocol (IP) set-top box to receive broadcast media content from a broadcast delivery infrastructure and on-demand media content from an IP delivery infrastructure. The broadcast delivery infrastructure can generate a quadrature amplitude modulated (QAM) signal, while the IP delivery infrastructure can generate an IP-based signal. The system uses a format converter to convert the QAM signal into a rights-protected signal expressed in an IP-compatible format. The format converter can be implemented as an OpenCable Unidirectional Receiver (OCUR) device.

20 Claims, 5 Drawing Sheets

(56) References Cited

U.S. PATENT DOCUMENTS

| | | | |
|---|---|---|---|
| 8,370,872 B1* | 2/2013 | Sun et al. | 725/39 |
| 8,397,260 B2* | 3/2013 | Adachi | 725/43 |
| 2002/0019834 A1 | 2/2002 | Vilcauskas, Jr. et al. | |
| 2002/0046406 A1 | 4/2002 | Chelehmal et al. | |
| 2002/0107027 A1 | 8/2002 | O'Neil | |
| 2002/0108119 A1 | 8/2002 | Mao et al. | |
| 2002/0129374 A1 | 9/2002 | Freeman et al. | |
| 2002/0147978 A1* | 10/2002 | Dolgonos et al. | 725/62 |
| 2002/0169540 A1 | 11/2002 | Engstrom | |
| 2003/0035007 A1* | 2/2003 | Wugofski | 345/764 |
| 2003/0051246 A1* | 3/2003 | Wilder et al. | 725/49 |
| 2003/0065805 A1 | 4/2003 | Barnes | |
| 2003/0093795 A1* | 5/2003 | Takahashi et al. | 725/49 |
| 2003/0196211 A1 | 10/2003 | Chan | |
| 2003/0207696 A1 | 11/2003 | Willenegger et al. | |
| 2003/0217365 A1 | 11/2003 | Caputo | |
| 2003/0220984 A1 | 11/2003 | Jones et al. | |
| 2004/0034877 A1 | 2/2004 | Nogues | |
| 2004/0209602 A1 | 10/2004 | Joyce et al. | |
| 2005/0055721 A1 | 3/2005 | Zigmond et al. | |
| 2005/0080665 A1 | 4/2005 | Bowman-Amuah | |
| 2005/0210138 A1 | 9/2005 | Zigmond et al. | |
| 2005/0267816 A1 | 12/2005 | Jaramillo | |
| 2005/0267845 A1* | 12/2005 | Oh et al. | 705/51 |
| 2005/0289623 A1 | 12/2005 | Midani et al. | |
| 2006/0015409 A1 | 1/2006 | Kato et al. | |
| 2006/0036495 A1 | 2/2006 | Aufricht et al. | |
| 2006/0064348 A1 | 3/2006 | Li | |
| 2006/0074769 A1 | 4/2006 | Looney et al. | |
| 2006/0130110 A1* | 6/2006 | Cho et al. | 725/111 |
| 2006/0184990 A1* | 8/2006 | Kwak et al. | 725/111 |
| 2006/0218588 A1 | 9/2006 | Kelts | |
| 2006/0235993 A1* | 10/2006 | Gervais et al. | 709/238 |
| 2007/0081537 A1* | 4/2007 | Wheelock | 370/392 |
| 2007/0116048 A1 | 5/2007 | Addington | |
| 2007/0288715 A1* | 12/2007 | Boswell et al. | 711/164 |
| 2008/0059645 A1* | 3/2008 | Gregotski et al. | 709/231 |
| 2008/0059646 A1* | 3/2008 | Ludvig et al. | 709/231 |
| 2008/0310436 A1* | 12/2008 | Bareis | 370/402 |
| 2010/0251310 A1* | 9/2010 | Hirota et al. | 725/59 |
| 2013/0097642 A1* | 4/2013 | Cragun et al. | 725/59 |

OTHER PUBLICATIONS

CableLabs. "OpenCable™ Specifications OpenCable Unidirectional Receiver OC-SP-OCUR-I04-060622." [Retreived Online on May 4, 2009] First Publication Jun. 2, 2005. [Retreived from the In ternet] <URL: http://www.opencable.com/downloads/specs/OC-SP-OCUR-I04-060622.pdf>.*

Aalto, et al., "Bluetooth and WAP Push Based Location-Aware Mobile Advertising System", MobiSYS, ACM, 2004, 10 pages.

"ARRIS to Demonstrate Wideband Data and IPTV at NCTA", available at <<http:www.commsdesign.com/press_releases/prnewswire/showPressRelease.jhtml?HeadlineId=X310468&CompanyID=1>>, retrieved on Jun. 26, 2006, CommsDesign, Suwanee, GA, Apr. 1, 2005, 3 pages.

"Cable operators revamp video services", retrieved on Jun. 29, 2006 at <<http://www.fierceiptv.com/node/956>>, Jun. 15, 2006.

Dan, et al., "Channel Allocation Under Batching and VCR Control in Video-on-Demand Systems," abstract of paper presented in Multimedia Processing and Technology, vol. 30, No. 2, pp. 168-179, 1995, abstract available at <<http://cat.inist.fr/?aModele=afficheN&cpsidt=2971078>>, accessed on Jun. 21, 2006, 2 pages.

Dan, et al., "Scheduling Policies for an On-Demand Video Server with Batching," Multimedia '94, 1994, available at <<http://delivery.acm.org/10.1145/200000/192614/p15-dan.pdf?key1=192614&key2=7437490511&coll=Portal&dl=GUIDE&CFID=74220359&CFTOKEN=92790055>>, pp. 15-23.

Hinze, et al., "Location- and Time-Based Information Delivery in Tourism", available at <<http://www.springerlink.com/(fuklby45eg0g4tq2c1tqmw45)/app/home/contribution.asp?ref . . . >>, Abstract printed on May 4, 2006, 2 pages.

"MSOs Get serious About IPTV", retrieved on Jun. 29, 2006, at <<http://www.darkreading.com/document.asp?doc_id=97222&WT.svl=wire_8>>, Darkreading, New York, Jun. 12, 2006 pp. 1-5.

"OpenTV IPTV Solutions", retrieved at <<http://www.opentv.com/files/OpenTv/OpenTv_IPTV_Whitepaper.pdf>> OpenTv, Inc., San Francisco, Sep. 2005.

Tseng, at al., "Seamless Channel Transition for the Staircase Video Broadcasting Scheme," IEEE/ACM Transactions on Networking, vol. 12, No. 3, Jun. 2004, pp. 559-571.

"China's Multi-Tiered TV Landscape", retrieved on Sep. 15, 2009 at <<http://www.tnsglobal.com/_assets/files/TNS_AudienceMatters_Insert.pdf>>, TNS Media Research, 2 pgs.

Ensim Corporation, "Case Study: Fibre Wired", Ensim Corporation, 2007, 2 pages.

Han, et al., "An Efficient Channel Allocation Scheme for Multicast Traffic in Multitier Cellular Systems", retrieved on Sep. 15, 2009 at <<http://brahms.kaist.ac.kr/down/file_0PpQrG.pdf>>, IEICE Trans. Commun., vol. E84-B, No. 4, Apr. 2001, pp. 1087-1093.

Chehimi, et al., "Delivering 3D Advertising to Mobile Phones," IEEE, Consumer Electronics, ICCE, Jan. 7-11, 2006, pp. 455-456.

"Enterprise Solution IPTV," ADTEC Digital, Nashville, Tennessee, available at <<http://www.adtecinc.com/documentcenter/brochures/iptv%20brochure.pdf>>, accessed on Jun. 29, 2006, 2 pages.

* cited by examiner

STRATEGIES FOR INTEGRATING PLURAL MODES OF CONTENT DELIVERY

BACKGROUND

A conventional cable distribution system uses a head-end center to broadcast media content to a plurality of client devices via a cable distribution network. The cable distribution network can be implemented as a coaxial cable network or as a combination of fiber-optic and coaxial cable networks. This hybrid solution is referred to as a Hybrid Fiber Coax (HFC) system.

In one well known approach, the cable system broadcasts media content (such as television programs) over a plurality of channels. In the case of digital channels, the head-end center commonly uses quadrature amplitude modulation (QAM) to modulate media content for transmission over the cable network. More specifically, the head-end center can multiplex together a plurality of digital channels into a single transport stream and then convey these channels over a QAM signal on a 6 MHz carrier.

A client device in a cable system may include a cable set-top box for receiving and processing the media content. The set-top box supplies processed media content to a television set for output to a user. In operation, a user generates a channel tune event in conventional fashion, e.g., by selecting a channel with a remote control device. In response, the set-top box uses a tuner to selectively extract desired media content from one of the channels. The tuner performs this task by adjusting a bandpass filter such that content delivered over an identified frequency is selectively extracted from a received broadcast signal.

A conventional satellite system uses a similar approach to broadcast media content to set-top boxes. In this approach, a satellite distribution infrastructure is used to supply broadcast media content to set-top boxes. The set-top boxes extract desired channels from the broadcast media content by using a physical tuning mechanism in the manner described above.

The market has also recently seen the emergence of Internet Protocol (IP) based systems for delivering media content. According to one such system, one or more servers can be used to deliver media content to a plurality of client devices over an Internet-Protocol (IP) network. The client devices can comprise IP-enabled set-top boxes. Instead of a physical tuner that uses a bandpass filter, an IP set-top box includes a virtual tuner. The virtual tuner accesses a stream of digital content by specifying an address associated with a server-side source of the media content. Compared to traditional broadcast solutions, IP-based systems can offer more targeted content to individual IP set-top boxes, that is, by enabling dedicated one-to-one transmission of media content to individual set-top boxes.

While IP-based solutions may be superior to conventional cable and satellite broadcast systems in some respects, the industry has invested a significant amount of financial resources in this type of traditional technology. Accordingly, simply abandoning traditional systems in favor of IP-based solutions may not be a feasible option.

SUMMARY

A hybrid system is described which allows an Internet Protocol (IP) set-top box to receive broadcast media content from a broadcast delivery infrastructure and on-demand media content from an IP delivery infrastructure. The broadcast delivery infrastructure can generate a quadrature amplitude modulated (QAM) signal, while the IP delivery infrastructure can generate an IP-based signal. The system uses a format converter to convert the QAM signal into a rights-protected signal expressed in an IP-compatible format. The format converter can be implemented as an OpenCable Unidirectional Receiver (OCUR) device.

Additional exemplary implementations and attendant benefits are described in the following.

Figure 1:
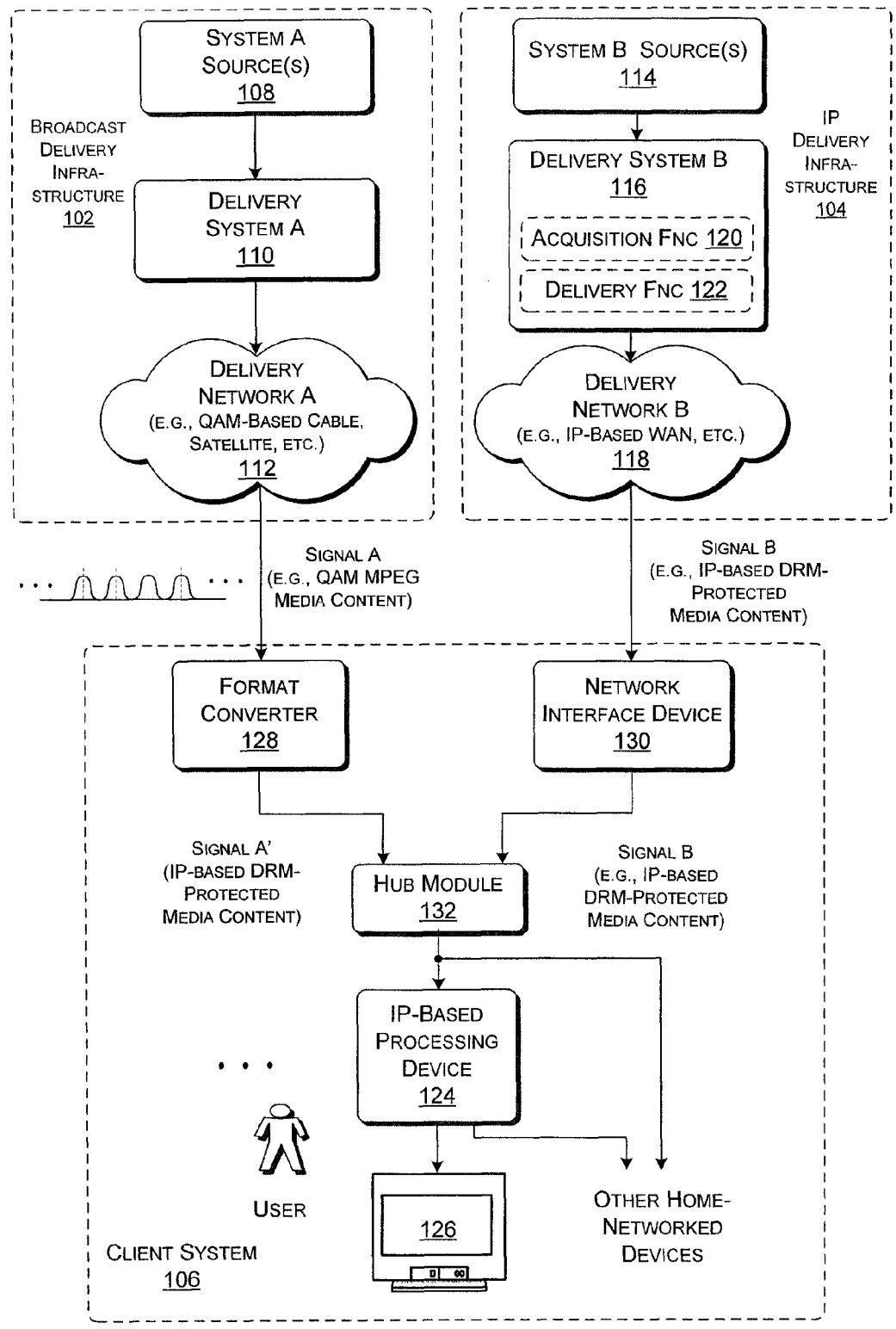
FIG. 1 shows an exemplary system for receiving media content from two different media delivery infrastructures.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a strategy for integrating a traditional broadcast delivery infrastructure with an Internet Protocol (IP) delivery infrastructure. The strategy uses a format converter to convert media content received from the broadcast delivery infrastructure into rights-protected media content expressed in an IP format. An IP-enabled set-top box can then receive media content from both the broadcast delivery infrastructure and the IP delivery infrastructure.

Through the above-summarized provisions, the strategy allows for the continued use of a traditional broadcast delivery infrastructure within an IP environment. The strategy is useful because it allows users to gain the benefits associated with an IP system without abandoning a pre-existing broadcast delivery infrastructure (in which a service provider may have invested significant financial and technical resources). The benefits of an IP system include, without limitation, the ability to provide dedicated media content to individual client devices, and therefore the ability to provide media content to client devices in a more targeted and on-demand fashion.

The term "media content" as used herein has broad connotation. Media content can refer to video content, audio content, still image content, program-related content (e.g., game-related content), and so forth, or any combination thereof For example, media content can correspond to television programs, movies, music, and so forth. The term "media item" refers to a particular instance of media content, such as a particular television program, movie, song, and so forth.

This disclosure includes the following sections. Section A describes an exemplary system for delivering media content to client devices. Section B describes an exemplary procedure that explains the operation of the system of Section A.

A. Exemplary System

As a preliminary note, any of the functions described with reference to the figures can be implemented using software, firmware, hardware (e.g., fixed logic circuitry), manual processing, or a combination of these implementations. The term "logic, "module," "system" or "functionality" as used herein generally represents software, firmware, hardware, or a combination of the elements. For instance, in the case of a software implementation, the term "logic," "module," "system," or "functionality" represents program code that performs specified tasks when executed on a processing device or devices (e.g., CPU or CPUs). The program code can be stored in one or more computer readable memory devices.

More generally, the illustrated separation of logic, modules, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

A.1. System Overview

FIG. 1 shows an exemplary system 100 for delivering media content to users. The system integrates two media delivery infrastructures, comprising media delivery infrastructure A 102 and media delivery infrastructure B 104. A client system 106 receives media content delivered via the two media delivery infrastructures (102, 104) via a single set-top box. In the implementation of FIG. 1, the media delivery infrastructure A 102 and the media delivery infrastructure B 104 do not share any components. In other implementations, these two infrastructures (102, 104) can share one or more common components.

The media delivery infrastructure A 102 can comprise a traditional infrastructure for delivering media content, such as a traditional cable system or a traditional satellite system. This infrastructure 102 can include one or more sources 108 of media content, a delivery system 110 for delivering the media content, and a delivery network 1 12 for actually routing the media content to the client systems.

In the case of a cable environment, the delivery system 110 can comprise a head-end center (or centers) for broadcasting media content to a plurality of client systems over a plurality of channels. In one case, the delivery system 110 can convert digital media content to be sent over a particular channel into a quadrature amplitude modulated (QAM) signal for transmission over the delivery network 112.

The delivery network 112 can include a collection of cable links or a combination of cable and fiber optic links (constituting a hybrid fiber coax system). The delivery network 112 can also employ a plurality of nodes to deliver media content, with each node serving a group of client systems. The delivery network 112 can provide a downstream path (e.g., for providing media content and other data to the client system 106) and an uplink path (e.g., for returning tune selections and other data to the delivery infrastructure 102). The uplink path can be implemented as an in-band return path or an out-of-band return path.

In the case of a satellite delivery environment, the delivery system 1 10 and delivery network 112 can include one or more satellite transmitters for broadcasting media content to the plurality of client systems. Alternatively, the delivery system 110 and delivery network 112 can include one or more terrestrial antennae.

The media delivery infrastructure B 104 can comprise Internet Protocol (IP)-based functionality for delivering media content to client systems. An IP-based approach, as this term is broadly used herein, refers to any approach in which selected media content can be transmitted to a client system over a digital network in packet-switched form, based on the client system's identification of a network-accessible address associated with the selected content. This infrastructure 104 can include one or more sources 114 of media content, a delivery system 116 for delivering the media content, and a delivery network 118 for actually routing the media content to the client systems. The following description refers to one exemplary IP-delivery infrastructure developed by Microsoft Corporation, of Redmond, Wash., although the system 100 can also be used with other types of IP-based delivery infrastructures.

The delivery system 116 can comprise acquisition functionality 120 for receiving digital content from the sources 114. The acquisition functionality 120 can also perform various preliminary processing on the received media content. Such preliminary processing can involve converting the media content into a format that is suitable for delivery to the client system 106 over the delivery network 118. The preliminary processing can also involve applying various types of rights management protection to the media content (e.g., to prevent unauthorized consumption of the media content).

The delivery system 116 can also include delivery functionality 122. The delivery functionality 122 can facilitate the transfer of media content to the client system 106. Different systems may use the delivery functionality 122 in different ways. One exemplary system may use the delivery functionality 122 to transmit media content in unicast fashion. In a unicast mode of transmission, the delivery functionality 122 provides a dedicated stream of media content (provided by dedicated server resources) to the client system 106. Alternatively, the delivery system 116 can deliver the media content to the client system 106 in multicast fashion. In the multicast mode of transmission, the delivery system 116 can provide the media content through a tree of distribution nodes. In another implementation, the delivery functionality 122 can deliver media content using a combination of unicast communication and multicast communication. For example, the delivery functionality 122 can deliver a media item to the client system 106 in unicast fashion when the client system 106 first tunes to a particular channel. To facilitate quick acquisition of the content, the delivery functionality 122 can provide this unicast stream at a burst rate (which is greater than the nominal or steady state rate of the stream). After a predetermined period of time, the client system 106 can transition from the unicast stream to an established multicast stream (where both unicast stream and multicast stream pertain to the same media content). Co-pending and commonly assigned U.S. patent application Ser. No. 10/010,200 (the '200 Application), entitled, "ACCELERATED CHANNEL CHANGE IN RATE-LIMITED ENVIRONMENTS," naming the inventors of Geoffrey R. Smith et al., filed on Dec. 10, 2004, provides further exemplary details regarding one protocol for delivering media content using a combination of unicast and multicast techniques. The '200 Application is incorporated by reference herein in its entirety.

The delivery network 118 couples the delivery system 116 to the client systems, such as representative client system 106. The delivery network 118 can be implemented in different ways to suit different technical and commercial environments. For instance, the delivery network 118 can include any kind of network (or combination of networks), such as a wide area network (e.g., the Internet), an intranet, Digital Subscriber Line (DSL) network infrastructure, point-to-point coupling infrastructure, and so on. The delivery network 118 can use or involve any kind of packet-switched protocol or combination of protocols. In the case where one or more digital networks are used to disseminate information, the delivery network 118 can include various hardwired and/or wireless links, routers, gateways, name servers, and so on. In the case where DSL infrastructure is used to disseminate information, the delivery network 118 can utilize the services, in part, of telephone coupling infrastructure and DSL processing functionality. The delivery network 118 can provide a downstream path (e.g., for providing media content and other data to the client system 106) and an uplink path (e.g., for returning tune selections and other data to the delivery system 116).

The media content transmitted over the delivery network 118 can be expressed in any format, including, but not limited to, the MPEG-2 standard, Microsoft Corporation's VC-1 standard, the ISO/ITU H.264 standard, and so forth. The coded media content can be encapsulated into packets using any format, including, but not limited to, the Real Time Transport Protocol (RTP), the Real Time Streaming Protocol (RTSP), the Advanced Streaming Format (ASF), and so forth.

Now addressing the client-side aspects of the system 100, FIG. 1 shows an exemplary client system 106, which is representative of many other client systems (not shown). Each client system may be located in a user's home, or other locus of media processing. By way of overview, the client system 106 receives signals generated by the both the traditional broadcast delivery infrastructure 102 and the IP-based delivery infrastructure 104. The client system 106 processes these signals using an IP-based processing device 124, for output to a presentation device 126 or other home-networked device (not shown). The IP-based processing device 124 can comprise a set-top box that is configured to receive and process media content delivered over an IP network.

Figure 2:
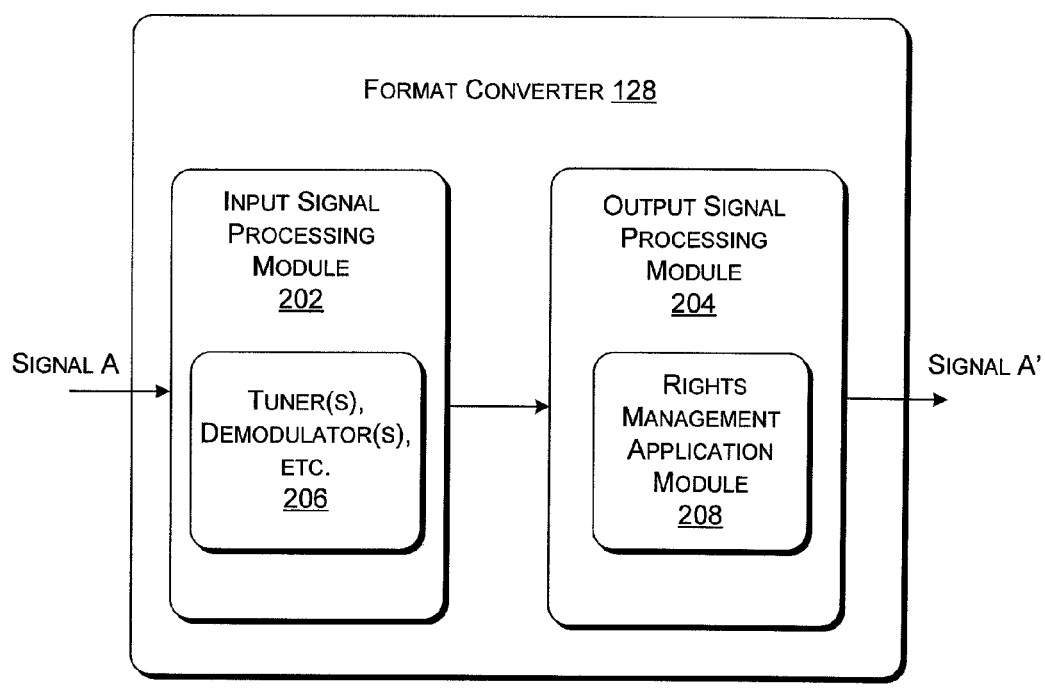
FIG. 2 shows an exemplary format converter for use in the system of FIG. 1.

To function in the above-described manner, the client system 106 includes a format converter 128. The purpose of the format converter 128 is twofold. First, the format converter 128 converts the media content from the QAM-based format (in which it is provided by the broadcast infrastructure 102) into an IP-based format that is consistent with the format expectations of the processing device 124. Second, the format converter 128 applies digital rights management (DRM) protection to the received media content that is consistent with the rights management expectations of the processing device 124. FIG. 2, to be discussed in turn, shows the composition of one exemplary format converter 128.

The client system 106 includes a complementary network interface device 130 for receiving media content from the IP-based delivery infrastructure 104. The network interface device 130 can comprise any type of device for receiving signals from the delivery network 118, including a DSL modem, a cable modem, and so forth. Since the media content received from the IP-based infrastructure 104 is already in an IP-based format, the network interface device 130 does not need to convert the format of the received media content into an IP-based format.

Finally, the client system 106 includes a hub module 132. The hub module 132 represents any kind of switching or routing mechanism for directing the output of the format converter 128 and the network interface device 130 into the IP-based processing device 124. In one case, the IP-based processing device 124 can be configured to simultaneously receive the output of the format converter 128 and the network interface device 130. In another case, the IP-based processing device 124 can be configured to receive, at any one time, either the output of the format converter 128 or the network interface device 130, e.g., depending on a selection made by the user.

In one exemplary application, the format converter 128, network interface device 130, hub module 132, and IP-based processing device 124 can be integrated into a single unit. In another exemplary application, the format converter 128, network interface device 130, hub module 132, and IP-based processing device 124 can each comprise separate units, these units being communicatively coupled together. In another implementation, any two or more of the format converter 128, network interface device 130, hub module 132, and IP-based processing device 124 can be integrated together.

A.2. Exemplary Applications of the System

The system 100 can be applied to many different uses. According to one use, the traditional delivery infrastructure 102 is used to deliver broadcast media content. For instance, the broadcast delivery infrastructure 102 can deliver a plurality of channels containing television programs, movies, commercials, music, etc. based on a predefined schedule. A client system can receive a desired media item by tuning to an appropriate channel when the item is scheduled to air.

On the other hand, the IP-based delivery infrastructure 104 can be used to primarily deliver on-demand content. For instance, the IP-based delivery infrastructure 104 can be used to deliver television programs, movies, commercials, music, etc. when requested by users. Alternatively, the IP-based delivery infrastructure 104 can deliver on-demand content in response to other triggering events (that is, not necessarily in response to requests made by human users). Generally, unlike the case of the broadcast delivery infrastructure 102, the IP-based delivery infrastructure 104 can deliver media content at arbitrary times (meaning that the delivery is not restricted to a pre-defined schedule).

The IP-based processing device 124 can process the signals received from the broadcast delivery infrastructure 102 and the on-demand IP-based infrastructure 104 in different ways to suit different application scenarios. In one scenario, the user can expressly enter an instruction to select between media content that is delivered via the broadcast delivery infrastructure 102 and media content that is delivered via the IP-based delivery infrastructure 104. In connection therewith, the IP-based processing device 124 can accommodate the presentation of separate electronic program guides (EPGs) for the two respective infrastructures (102, 104). Or the IP-based processing device 124 can provide a single EPG that integrates metadata associated with programming provided by the two respective infrastructures (102, 104).

In another case, the IP-based processing device 124 can combine media content received from the broadcast delivery infrastructure 102 and media content received from the IP-based delivery infrastructure 104. For instance, in a picture-in-picture scenario, the IP-based processing device 124 can present media content received from one infrastructure in one window and media content received from another infrastructure in another window. The two windows can occupy separate parts of a display screen. Or one window may overlap another window.

In another case, the IP-based processing device 124 can temporally intersperse media content received from one infrastructure into media content received from another infrastructure. For example, as a main feature, the IP-based processing device 124 can present a broadcast television program received via the broadcast delivery infrastructure 102. The IP-based processing device 124 can insert commercials or other content received from the IP-based network infrastructure 104 within the broadcast television program. The IP-based content that is inserted into the broadcast television program can be selected in advance or can be dynamically selected based on or more triggering circumstances. For instance, the IP infrastructure 104 can dynamically select commercials for insertion into a broadcast media program based on the tuning selections made by the user.

Still further application scenarios are possible. In other cases, for instance, the IP-based delivery infrastructure 104 is not limited to presenting on-demand media content. For instance, the IP-based delivery infrastructure 104 can also deliver broadcast (e.g., multicast) media content that is presented in accordance with a fixed time schedule. In other cases, the IP-based delivery infrastructure 104 can present a combination of on-demand media content and multicast (fixed schedule) media content.

A.3. Exemplary Format Converter

FIG. 2 shows a more detailed view of the format converter 128 introduced in the context of FIG. 1. The format converter 128 includes two main modules. An input signal processing module 202 performs the primary task of interpreting the QAM signal received from the broadcast delivery infrastructure 102. An output signal processing module 204 performs the primary task of converting the received media content into a rights-protected signal expressed in an IP format, to thereby accommodate the input expectations of the IP-based processing device 124.

The input signal processing module 202 can include various signal processing components 206. The signal processing components 206 can include, without limitation, one or more tuners for selecting a frequency from which to receive a desired signal, one or more demodulators to demodulate the received signal, and one or more de-multiplexers to separate individual components of the received signal, and so forth. The input signal processing module 202 can also include appropriate functionality to decrypt the received signal (that is, insofar as the media content received from the broadcast media infrastructure 102 is protected (e.g., encrypted)).

The output processing module 204 can include various sub-modules used to format the media content into a stream of IP-compatible packets. The output processing module 204 can also include a rights management application module 208. The purpose of this module 208 is to apply an appropriate digital rights management protocol to the media content to accommodate the rights management expectations of the IP-based processing device 124.

According to one exemplary implementation, the format converter 128 can be implemented as an OpenCable Unidirectional Cable Receiver (OCUR). The OCUR device is described, for instance, in OpenCable™ Specifications, OpenCable Unidirectional Receiver, OC-SP-OCUR-104-60622, Cable Television Laboratories, Inc., Jun. 26, 2006.

Figure 3:
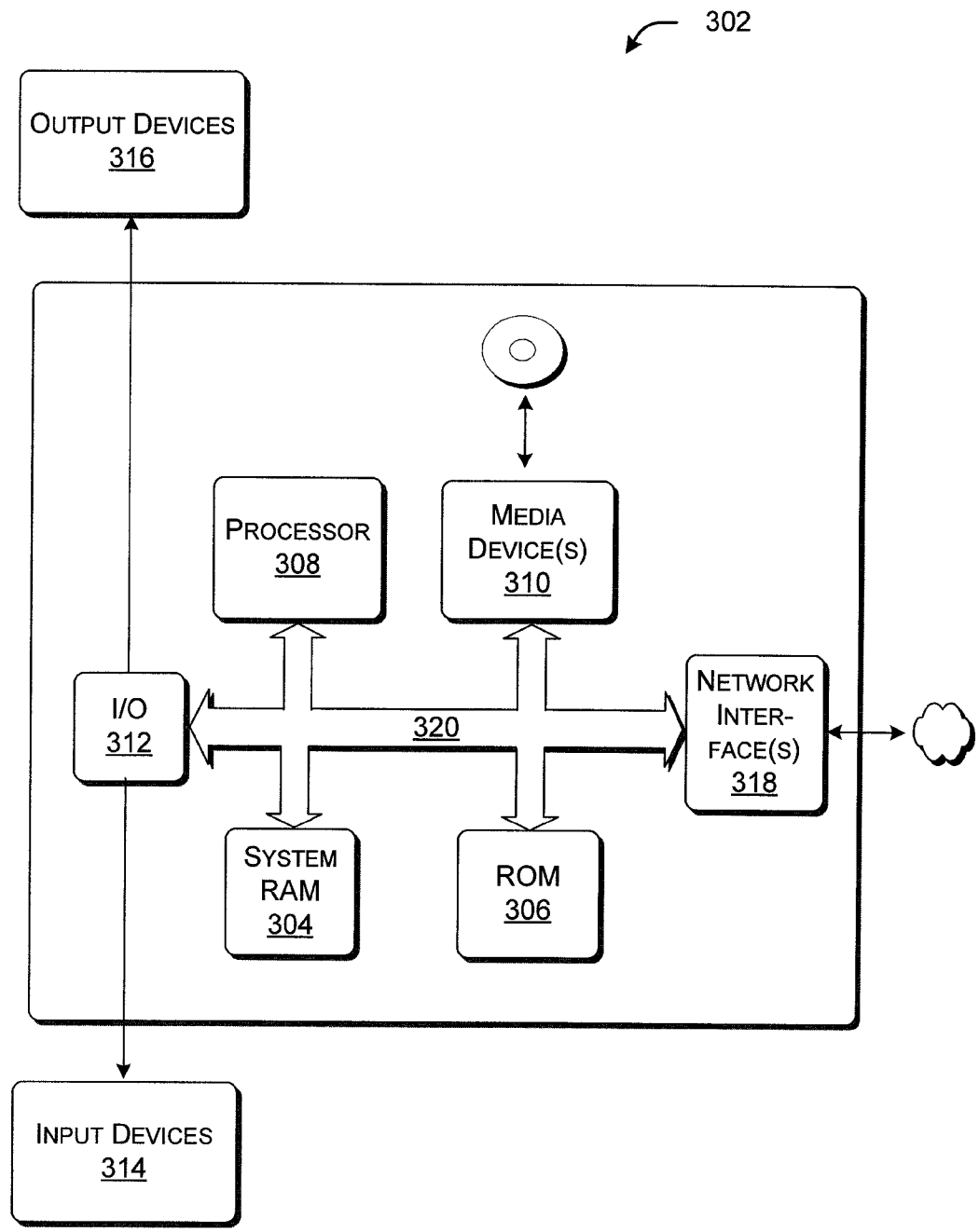
FIG. 3 shows exemplary processing functionality for implementing any head-end aspect of the system of FIG. 1.

A.4. Exemplary Functionality for Implementing Any Aspect of the Operations Center FIG. 3 sets forth exemplary processing functionality 302 that can be used to implement any aspect of the IP-based delivery system 116 of FIG. 1. For example, any component provided by the IP-based delivery system 116 can be implemented, in part, by one or more server-type computers. FIG. 3 describes the exemplary composition of such a server-type computer. In general, the processing functionality 302 can be located at a single head-end site and/or spread over plural sites.

The processing functionality 302 can include various volatile and non-volatile memories, such as RAM 304 and ROM 306. The processing functionality 302 can also include one or more central processing units (CPUs) 308. The processing functionality 302 can perform various operations identified above when the processing unit(s) 308 executes instructions that are stored in memory (304, 306). The processing functionality 302 also optionally includes various media devices 310, such as a hard disk module, an optical disk module, and so forth.

The processing functionality 302 also includes an input/output module 312 for receiving various inputs from the user (via input devices 314), and for providing various outputs to the user (via output devices 316). The processing functionality 302 can also include one or more network interfaces 318 for exchanging data with other devices via one or more communication conduits (e.g., networks). One or more communication buses 320 communicatively couple the above-described components together.

A.5. Exemplary Functionality for Implementing a Client Processing Device

Figure 4:
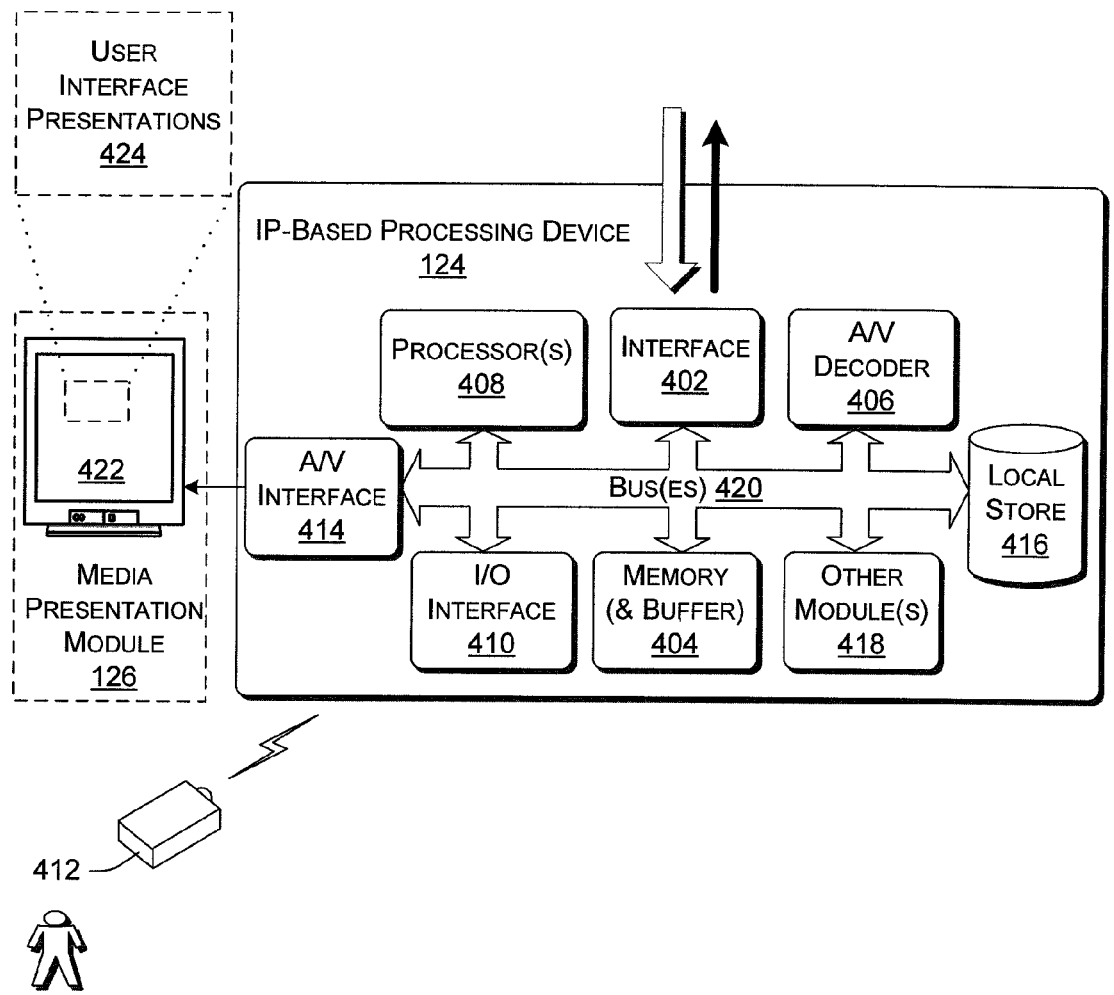
FIG. 4 shows an exemplary IP-based processing device for use in the system of FIG. 1.

FIG. 4 provides additional details regarding the representative IP-based processing device 124 and association presentation device 126. The processing device 124 can be implemented as an IP-based set-top box. Alternatively, the processing device 124 can be implemented as a television set with integral IP interfacing/processing functionality, a digital video recorder (DVR) device, a rewritable digital video disc (DVD-RW) device, a personal computer having AV decoding functionality, and so forth (as well as any combination of these devices). Or the processing device 124 can take the form of a mobile telephone, a personal digital assistant (PDA), tablet-type computer device, any kind of wearable computer (e.g., a wristwatch-type computer device), a game console, and so forth.

Whatever form the processing device 122 takes, the processing device 122 can include a number of modules for performing its ascribed tasks. To begin with, the processing device 124 includes interface module 402. The interface module 402 can represent any functionality for receiving media content from the hub module 132. In one case, the functionality of the network interface device 130 (and possibly even the hub module 132) can be integrated into the interface module 402. The processing device 124 also includes memory 404. The processing device 124 also includes an audio-visual (AV) decoder 406 for decoding (and decompressing) the received media content. The processing module 124 also includes one or more processors 408 for executing instructions to implement the functionality of the processing device 124. The processing device 124 also includes an I/O interface 410 for interacting with the user via one or more input devices, such as a remote controller 412. The processing device 124 also includes an A/V interface module 414 for providing media content in an appropriate format to the presentation device 126. The processing device 124 also includes a local store 416 for storing recorded programs and other data. Finally, the processing device 124 can include various other modules 418, not specifically identified by name in the figure. For instance, the client processing device 124 can include a graphics compositor for combining a video component of the media content from the AV decoder 406 on a frame-by-frame basis with graphics information. The graphics information may comprise various user interface presentations which are overlaid on the media content. One or more busses 420 communicatively couple the above-identified components together.

The presentation device 126 can comprise any kind of device for presenting AV information, including a CRT-type device, an LCD-type device, and so forth. In any case, the presentation device 124 defines a display surface 422. The processing device 124 can present one or more user interface presentations 424 on the display surface 422.

Co-pending and commonly assigned U.S. patent application Ser. No. 11/057,477 (the '477 Application), entitled, "TUNERLESS MEDIA PRESENTATION UNIT AND METHODS OF USE," naming inventors David L. de Heer et al., filed on Feb. 14, 2005, provides further exemplary details regarding one exemplary implementation of an IP-based processing device. The '477 application is incorporated by reference herein in its entirety.

B. Exemplary Procedures

Figure 5:
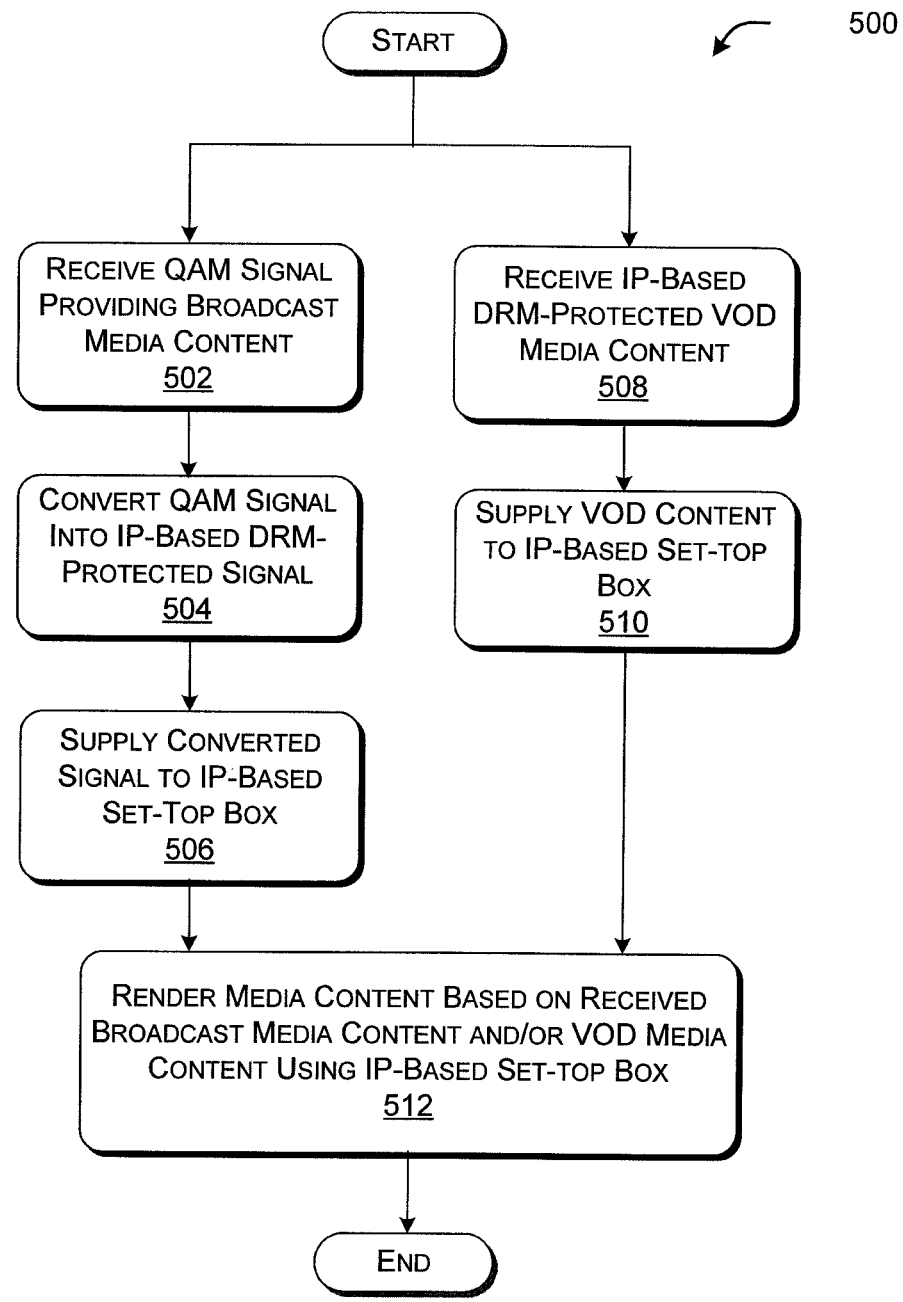
FIG. 5 shows an exemplary procedure for receiving and processing media content from two respective infrastructures, namely, a broadcast delivery infrastructure and an on-demand IP-based delivery infrastructure.

FIG. 5 shows a procedure which explains the operation of the system 100 in flow chart form. To facilitate discussion, certain operations are described as constituting distinct blocks performed in a certain order. Such implementations are exemplary and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

As the functions described in the flowcharts have already been set forth in Section A, Section B serves principally as a review of those functions.

FIG. 5 shows a procedure 500 which explains the operation of the system 100. The procedure includes two parallel branches. The two parallel branches respectively represent processing of a broadcast QAM signal and processing of an IP-based signal.

Starting with the left-most series of blocks corresponding to the broadcast delivery infrastructure 102, in block 502, the format converter 128 receives a QAM broadcast signal from the broadcast delivery infrastructure 102.

In block 504, the format converter 128 converts the QAM broadcast signal into a rights-protected signal expressed in an IP format.

In block 506, the format converter 128 supplies its output to the IP-based processing device 124.

Advancing to the right-most series of blocks corresponding to the IP-based delivery infrastructure 104, in block 508, the network interface device 130 receives an IP-based signal from the IP-based infrastructure 104. The network interface device 130 may optionally receive this media content in response to an on-demand request by the user, as opposed to a fixed schedule.

In block 510, the network interface device 130 supplies an IP-based output signal to the IP-based processing device 124.

In block 512, the IP-based processing device 124 receives and processes both the signal generated by the format converter 128 and the signal generated by the network interface device 130. Or the IP-based processing device 124 can select either the signal generated by the format converter 128 or the signal generated by the network interface device 130. As described above, the IP-based processing device 124 can combine the broadcast media content and the IP-based on-demand content in various ways, such as by interspersing on-demand content into broadcast media content.

In closing, a number of features were described herein by first identifying exemplary problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A system for receiving and processing media content, comprising:
   a format converter configured to:
      receive encrypted broadcast media content from a broadcast delivery infrastructure;
      decrypt the encrypted broadcast media content;
      convert the decrypted broadcast media content into an Internet Protocol (IP) format; and
      apply digital rights management protection to the broadcast media content converted into the IP format, the format converter thereby providing rights-protected media content expressed in the IP format;
   a network interface device for receiving on-demand media content from an IP delivery infrastructure, the on-demand media content being expressed in the IP format;
   an IP processing device configured to:
      receive and process one of a first output signal generated by the format converter and a second output signal generated by the network interface device;
      present a single electronic program guide ("EPG") that integrates metadata associated with media content from the broadcast delivery infrastructure and the IP delivery infrastructure and present a separate EPG for the media content from each of the broadcast delivery infrastructure and the IP delivery infrastructure; and
      temporally intersperse the media content received from each of the broadcast delivery infrastructure and the IP delivery infrastructure into media content received from another infrastructure, the temporally interspersed media content being simultaneously displayed in a same window, and wherein temporally interspersing the media content is based on at least one of a predetermined selection of the interspersed media content or a dynamic selection of the interspersed media content based at least in part on one or more triggering events.

2. The system of claim 1, wherein the format converter is an OpenCable Unidirectional Receiver (OCUR) device.

3. The system of claim 1, wherein the broadcast delivery infrastructure is a cable infrastructure or a satellite infrastructure or a terrestrial antennae infrastructure.

4. The system of claim 3, wherein the broadcast delivery infrastructure is a cable infrastructure which includes a hybrid fiber coax (HFC) delivery network.

5. The system of claim 1, wherein the broadcast media content that is received by the format converter is expressed as a quadrature amplitude modulated (QAM) signal.

6. The system of claim 1, wherein the IP delivery infrastructure comprises one or more servers that are communicatively coupled to an IP-based digital network.

7. The system of claim 1, wherein the network interface device comprises a digital subscriber line (DSL) modem.

8. The system of claim 1, wherein the IP processing device comprises an IP-enabled set-top box.

9. The system of claim 1, wherein the format converter, network interface device, and IP processing device comprise separate units that are communicatively coupled together.

10. The system of claim 1, wherein any two of the format converter, network interface device, and IP processing device are integrated together in a single unit.

11. The system of claim 1, wherein the format converter, network interface device, and IP processing device are integrated together in a single unit.

12. A method for receiving and processing media content, comprising:
receiving broadcast media content from a broadcast delivery infrastructure;
converting the broadcast media content into an Internet Protocol (IP) format and applying digital rights management protection to the broadcast media content converted into the IP format, to thereby provide a first IP format output signal;
receiving on-demand media content from an IP delivery infrastructure, the on-demand media content being expressed in the IP format, to thereby provide a second IP format signal; and
combining the first IP format output signal and the second IP format output signal at an IP processing device for simultaneous display on a presentation device, the IP processing device and the presentation device being configured to simultaneously display the first IP format signal in a first window on the presentation device and to display the second IP format signal in a second window on the presentation device, the first window on the presentation device and the second window on the presentation device displaying the first IP format signal and the second IP format signal in a picture-in-picture display, and to intersperse the first IP format signal with the second IP format signal simultaneously in a same window during display on the presentation device.

13. The method of claim 12, wherein the format converter is an OpenCable Unidirectional Receiver (OCUR) device.

14. The method of claim 12, wherein the broadcast delivery infrastructure is a cable infrastructure, a satellite infrastructure, or a terrestrial antennae infrastructure.

15. The method of claim 12, wherein the received broadcast media content is expressed as a quadrature amplitude modulated (QAM) signal.

16. The method of claim 12, wherein the IP delivery infrastructure comprises one or more servers that are communicatively coupled to an IP-based network.

17. The method of claim 12, wherein the IP processing device comprises an IP-enabled set-top box.

18. A system for receiving media content, comprising:
a first delivery infrastructure for delivering quadrature amplitude modulated (QAM) broadcast media content;
a format converter configured to:
receive the QAM broadcast media content over the first delivery infrastructure;
convert the QAM broadcast media content into an Internet Protocol (IP) format; and
apply digital rights management protection to the QAM broadcast media content converted to the IP format, the format converter thereby providing rights-protected media content expressed in the IP format;
a second delivery infrastructure for delivering on-demand media content expressed in the IP format;
a network interface device for receiving the on-demand IP media content over the second delivery infrastructure;
an IP processing device configured to:
receive and selectively process one of a first output signal generated by the format converter or a second output signal generated by the network interface device for output to a presentation device, wherein selection of an output signal generated by the format converter is based on a command issued to the IP processing device by a user;
combine the first output signal and the second output signal for simultaneous display on the presentation device, the first output signal being displayed in a first window of the presentation device and the second output signal being displayed in a second window of the presentation device; and
temporally intersperse media content received from each of the first delivery infrastructure and the second delivery infrastructure into media content received from another infrastructure, the temporally interspersed media content being simultaneously displayed in a same window, and wherein temporally interspersing the media content is based on at least one of a predetermined selection of the interspersed media content or a dynamic selection of the interspersed media content based at least in part on one or more triggering events.

19. The system of claim 18, wherein the format converter is an OpenCable Unidirectional Receiver (OCUR) device.

20. The system of claim 18, wherein the first delivery infrastructure is a cable infrastructure or a satellite infrastructure or a terrestrial antennae infrastructure, and the second delivery infrastructure comprises one or more servers that are communicatively coupled to an IP-based digital network.

* * * * *